United States Patent

Fujii et al.

[11] Patent Number: 5,829,547
[45] Date of Patent: Nov. 3, 1998

[54] POWER STEERING APPARATUS WITH PUMP DRIVEN BY PULSE WIDTH MODULATED CONTROLLED, BRUSHLESS D.C. ELECTRIC MOTOR

[75] Inventors: Tadaaki Fujii; Toshiro Yoda; Eiichi Tomioka, all of Saitama-ken, Japan

[73] Assignee: Jidosha Kiki Co., Ltd., Tokyo, Japan

[21] Appl. No.: 669,173

[22] Filed: Jun. 24, 1996

[30] Foreign Application Priority Data

Jul. 6, 1995 [JP] Japan .................................. 7-170763

[51] Int. Cl.⁶ .................................. B62D 5/06; B62D 6/02
[52] U.S. Cl. .................................................. 180/422
[58] Field of Search .................................. 180/417, 422, 180/423, 415

[56] References Cited

FOREIGN PATENT DOCUMENTS 56-67391  4/1981  Japan .
6-263053  9/1994  Japan .

Primary Examiner—Andrew C. Pike
Attorney, Agent, or Firm—Flynn, Thiel, Boutell & Tanis, P.C.

[57] ABSTRACT

An electric motor for driving an oil pressure pump which feeds pressurized oil to a power cylinder comprises a brushless d.c. motor. An onboard main battery comprises a main battery which is onboard an electrically driven vehicle and which is constructed as a high tension d.c. voltage source delivering a high voltage on the order of 96 to 600V. The battery is directly connected to the motor, and a controller is connected therebetween to provide a pulse width modulated variable voltage signal to the motor from the battery.

6 Claims, 5 Drawing Sheets

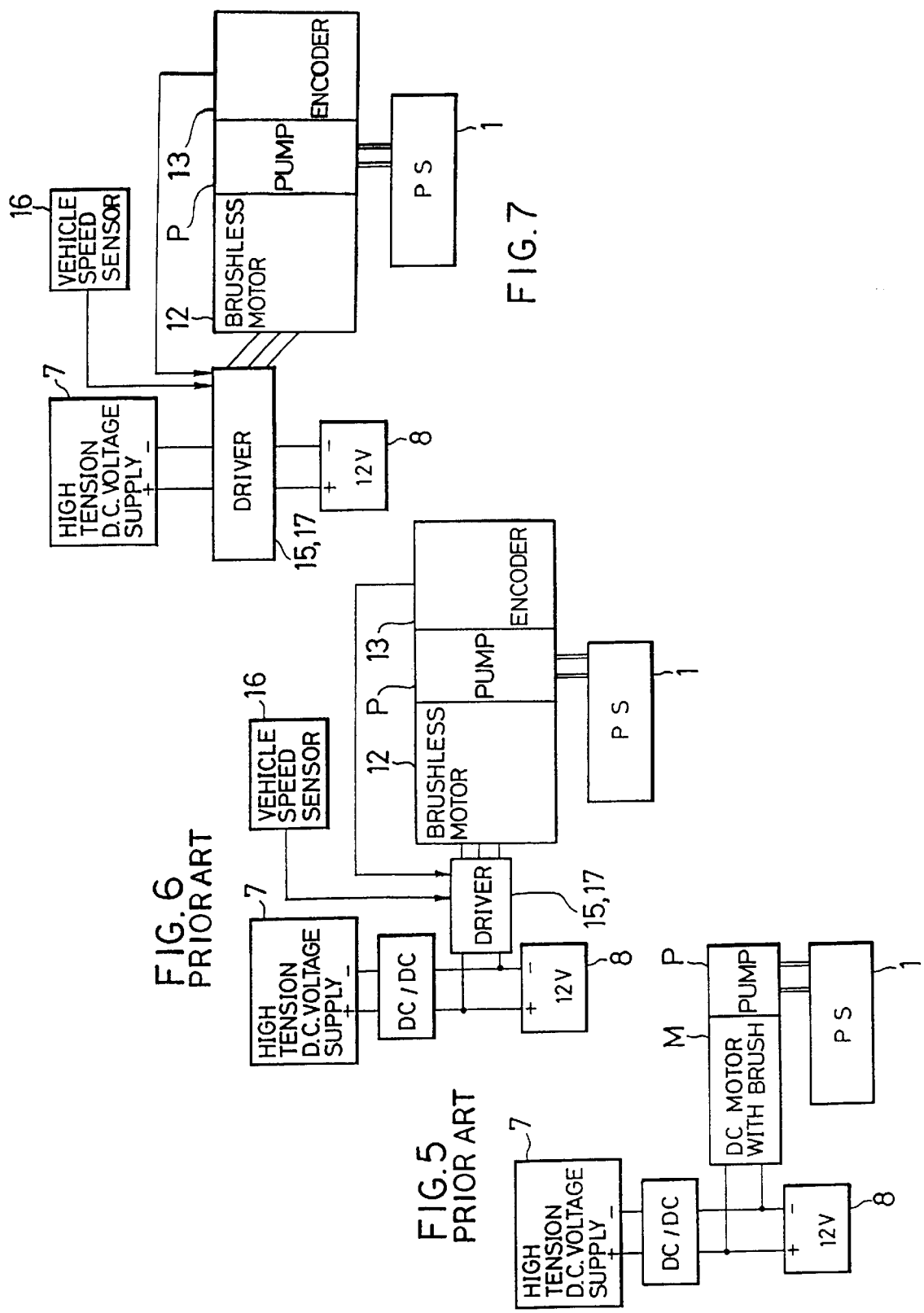

STATIONARY
(STEERING CONDITION)

LOW SPEED (ABOUT 20km/h)

MEDIUM SPEED (ABOUT 60km/h)

POWER STEERING APPARATUS WITH PUMP DRIVEN BY PULSE WIDTH MODULATED CONTROLLED, BRUSHLESS D.C. ELECTRIC MOTOR

FIELD OF THE INVENTION

The invention relates to a power steering apparatus in which a steering assist force or simply an assist force is obtained by feeding a fluid pressure to a power cylinder in accordance with a steering operation of a steering wheel and, in particular, to a power steering apparatus with motor driven pump in which a fluid pressure pump acting as a source of fluid pressure is driven by a d.c. brushless motor.

BACKGROUND OF THE INVENTION

A power steering apparatus with motor driven pump in which an oil pressure pump driven by an electric motor is used as the source of oil pressure to feed a pressure oil to a power cylinder in accordance with running conditions of a vehicle such as vehicle speed, steer angle, or the like in order to obtain a required assist force is proposed in various forms by Japanese Laid-Open Utility Model Application No. 67,391/81. It is to be noted that in a conventional arrangement, an electric motor used is generally a d.c. motor with brushes.

Recently, considerable efforts are directed to the development of an electrically driven automobile or an electrically driven automobile of hybrid type. A main battery which is onboard such vehicle is distinctive from a 12V or a 24V d.c. supply as is generally used in gasoline cars, but comprises a high tension d.c. power supply which provides a high voltage on the order of 96–600V, for example.

A common practice in the art to drive a d.c. motor with brushes used with an electrically driven vehicle utilizing a high tension d.c. power supply as a main battery has been to use d.c.-d.c. converter for purpose of voltage step-down, which is effective to step down the higher voltage to a level of 12V, which is then fed through a controller acting as a driver. However, the use of such d.c.-d.c. converter involves an increased amount of heat generation, a high power loss and an inefficient conversion efficiency during the voltage conversion. In addition, an apparatus which includes such a d.c.-d.c. converter requires an increased number of parts, and is complex in construction, resulting in a bulky assembly.

As a consequence of these circumstances, it is contemplated to use a controller acting as a driver for driving the pump driving motor from the high tension d.c. power supply while controlling the supply voltage on the order of 288V, for example, from the power supply in the form of a pulse width modulation (hereafter abbreviated as PWM) for direct application to the motor. However, when such an arrangement is used, a high voltage of 288V, for example, from the power supply is instantaneously applied to the motor when starting it, which causes a high level of heat generation in the area of sliding contact around the brush, causing a problem that a damage to the motor may result.

To accommodate for this, there has been a proposal disclosed in Japanese Laid-Open Patent Application No. 263,053/94 to employ an arrangement including a choke coil or a flywheel diode connected in a feeding circuit between the battery supply and the motor when directly feeding the high voltage from the high tension d.c. power supply or the onboard main battery directly to the d.c. motor with brush in order to drive it. In this arrangement, a controller delivers a high d.c. voltage which is controlled in the form of PWM signal in which the voltage level alternately repeats itself between 0V and the supply voltage from the high tension supply. This PWM output is in the form of a sliced d.c. voltage which, when passed through the choke coil connected in series with the motor, appears as a smoothed voltage waveform in which the voltage level alternates between a first voltage greater than 0V and a second voltage less than the supply voltage. When the PWM output comprising such smoothed voltage waveform is fed to the motor, a current level which occurs through the brush of the motor as a result of the application of the smoothed voltage waveform is reduced, thus tending to lower the rising slope of the current. However, with this arrangement, the need to provide a choke coil or a flywheel diode results in an inconvenience that the number of parts required is increased, the arrangement is still complex, and troublesome wiring is required. In addition, since such a conventional arrangement uses a motor with brush for driving the pump, it necessarily requires an electrical connection through the sliding contact of the brush with a commutator on the motor shaft. The area of sliding contact is susceptible to an abrasion, causing problems of useful life and acoustical noises generated and requiring frequent maintenance.

It is to be noted that a motor with brush can hardly accommodate for an increase in the voltage level because of the motor response. For example, if a voltage level on the order of 100V d.c. or higher is attempted to be used, the abrasion of the brush is worsened, presenting problems of a voltage drop and a leak current, which must be compensated for by corresponding considerations.

OBJECT AND SUMMARY OF THE INVENTION

Accordingly, it is a object of the invention to provide a power steering apparatus with motor driven pump which has a reduced number of parts required and a simplified arrangement while being capable of eliminating the abrasion and acoustical noises produced in the area of sticking contact which result from the usage of a motor with brush and also reducing the power dissipation.

The above object is accomplished by providing a controller in an arrangement in which an electric motor connected to an onboard battery drives a fluid pressure pump to feed a fluid pressure to a power cylinder in accordance with a steering operation in order to produce a steering assist force. In accordance with the invention, a main battery onboard an electrical driven vehicle is used as an onboard battery, a d.c. brushless motor is used as the electric motor mentioned above, and the controller is connected between the main battery and the motor to apply a voltage to the motor by PWM control.

In accordance with the invention, the d.c. brushless motor which drives the fluid pressure pump, acting as a source of generating an assist force, is directly connected to the main battery which comprises a high tension d.c. power supply which is onboard the electrically driven vehicle. The controller feeds the motor by the PWM control, thus enabling a drive in the required manner while reducing the power loss and the power dissipation.

An electrically driven vehicle is defined herein as a vehicle which is provided with an electric motor as a prime mover and includes an electrically driven vehicle of hybrid type which selectively uses an internal combustion engine as the prime mover in accordance with the running condition.

The main battery which is onboard the electrically driven vehicle comprises an onboard battery which delivers a high voltage on the order of 96–600V, for example, but may also use a battery which is capable of delivering a voltage higher than 600V.

BRIEF DESCRIPTION OF THE DRAWINGS

FIG. 5 is a block diagram of a prior art power steering apparatuses and, more particularly, depicts the primary components of this apparatus that supplies drive signals to the pump motors employed in this apparatus;

FIG. 6 is a block diagram of a prior art power steering apparatus and, more particularly, depicts the primary of this apparatus that supplies drive signals to the pump motor employed in this apparatus;

FIG. 7 is a block diagram of the power steering apparatus according to this invention;

DETAILS OF THE DESCRIPTION OF THE PREFERRED EMBODIMENTS

Figure 1:
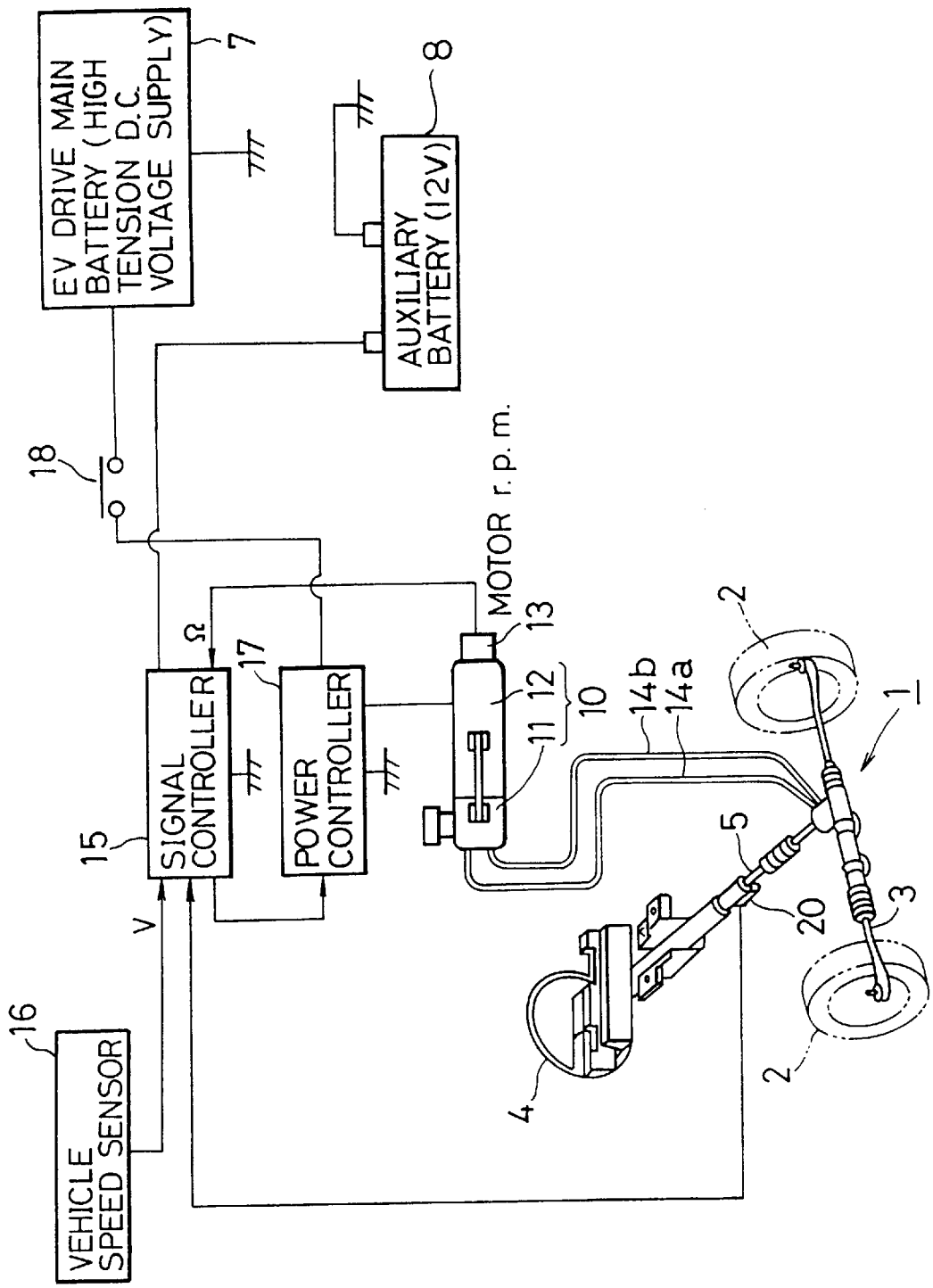
FIG. 1 is a schematic view illustrating a general arrangement of a power steering apparatus with motor driven pump according to one embodiment of the invention.

The invention will now be described with reference to an embodiment shown in the drawings. Referring to FIG. 1, a power steering apparatus of oil pressure type includes a body 1 including the rods 3 which are connected to right and left steerable wheels 2 of an automobile, shown in phantom lines, through knuckle arms.

While not specifically shown, the body 1 of the apparatus comprises a flow path switching valve which changes an oil flow path in response to the transmission of a steering operation of the steering wheel 4 to a steering shaft 5, a transmission which transmits the steering operation to the tie-rod 3, and a power cylinder including a left and right chamber into which the oil pressure may be introduced to produce an assist force in accordance with the steering operation, as is well recognized.

A main battery 7 is mounted on the vehicle which may comprise an electrically driven vehicle (EV), and comprises a high tension d.c. power supply delivering a voltage in a range from 96 to 600V (which is 336V in the embodiment shown). A low voltage supply 8 may comprise an auxiliary battery feeding 12V, for example, in order to drive accessories such as wipers. It is to be noted that the voltage of 336V of the main battery 7 is determined as an integral multiple of 12V.

A motor driven oil pump assembly 10 feeds a pressure oil, as a fluid pressure, to the body 1 of the apparatus, and comprises an oil pump (not shown) of vane type, an oil tank 11 formed by a casing which surrounds the oil pump, and a brushless d.c. motor 12 associated with the tank for driving the pump. An encoder 13 detects the rotational position of the rotor of the motor 12, thereby deriving a motor r.p.m., and is mounted on the end of the motor 12 which is located opposite from the tank 11. A supply piping 14a feeds the pressure oil from the oil pump to the body 1, from which the pressure oil is returned to the tank 11 through a return piping 14b.

A signal controller 15 is connected to the auxiliary battery 8, and receives a vehicle speed signal from a sensor 16, and a motor r.p.m. signal from the encoder 13. A power controller 17 is controlled by the signal controller 15 to feed a driving current to the motor 12. The power controller is connectable with the main battery 7 through an operation switch 18, which may be turned on to allow the power controller 17 to apply a driving voltage to the motor 12 in accordance with the signal from the signal controller 15.

Figure 3:
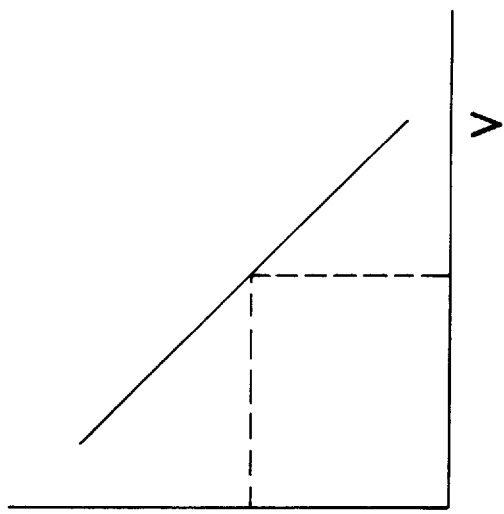
FIG. 3 is a graphic representation of the map internal to the signal controller that contains data representative of the target revolutions of the power steering pump motor as a function of vehicle speed.
Figure 2:
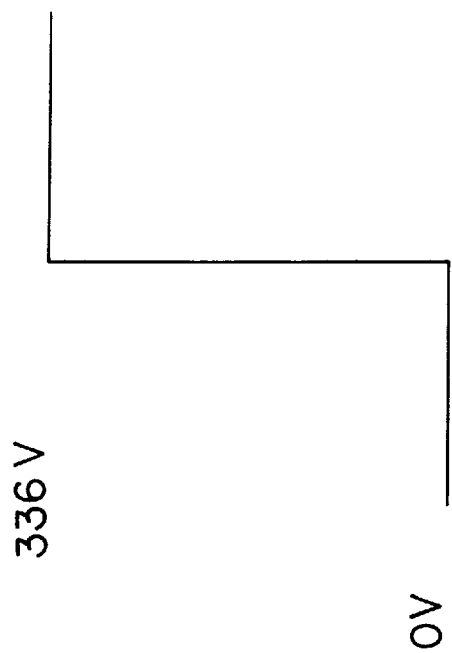
FIG. 2 is a graphical depiction of a drive voltage applied to other components of this system from the main battery through the opening of the operation switch.

FIG. 2 illustrates how, depending on the state of operation switch 18, main battery applies either a no voltage or a 336V signal to power controller 17. A combination of the signal controller 15 and the power controller 17 defines a controller which drives and controls the brushless motor 12. Specifically, the signal controller 15 includes a map, represented graphically by FIG. 3, which determines a target number of revolutions $\Omega_0$ of the motor 12 in response to a vehicle speed V which is supplied from the sensor 16. The signal controller 15 also receives a motor r.p.m. signal $\Omega$ which is supplied from the encoder 13.

More specifically describing the operation of the signal controller 15, it determines an absolute value of a difference between the target number of revolutions $\Omega_0$ and an actual number of revolutions $\Omega$ of the motor 12, and delivers a pulse width modulation (PWM) control signal to the power controller 17 which is effective to reduce such difference or deviation to below $\Delta\Omega$, thus controlling the d.c. voltage from the main battery 17 in accordance with the pulse width modulation. As a consequence, a PWM controlled output voltage delivered to the brushless motor 12 is averaged, assuming any value between 0V and a supply voltage of 336V (for example, 200V), thus allowing the brushless motor 12 to be driven at a desired number of revolutions, or under a condition which achieves a desired pump discharge flow.

When the brushless motor 12 is driven in this manner to operate the pump (not shown) in the manner required, a pressure oil of a required pressure is fed to the power cylinder through the flow path switching valve, not shown, of the bodies. This allows the magnitude of an assist force to be controlled when operating the steering wheel 4 so that the magnitude of the assist force may be increased to provide a light sensation of steering when the vehicle is running at low speed, while the magnitude of the assist force may be reduced to provide a heavy sensation of steering when the vehicle is running at a medium or high speed.

Figure 4:
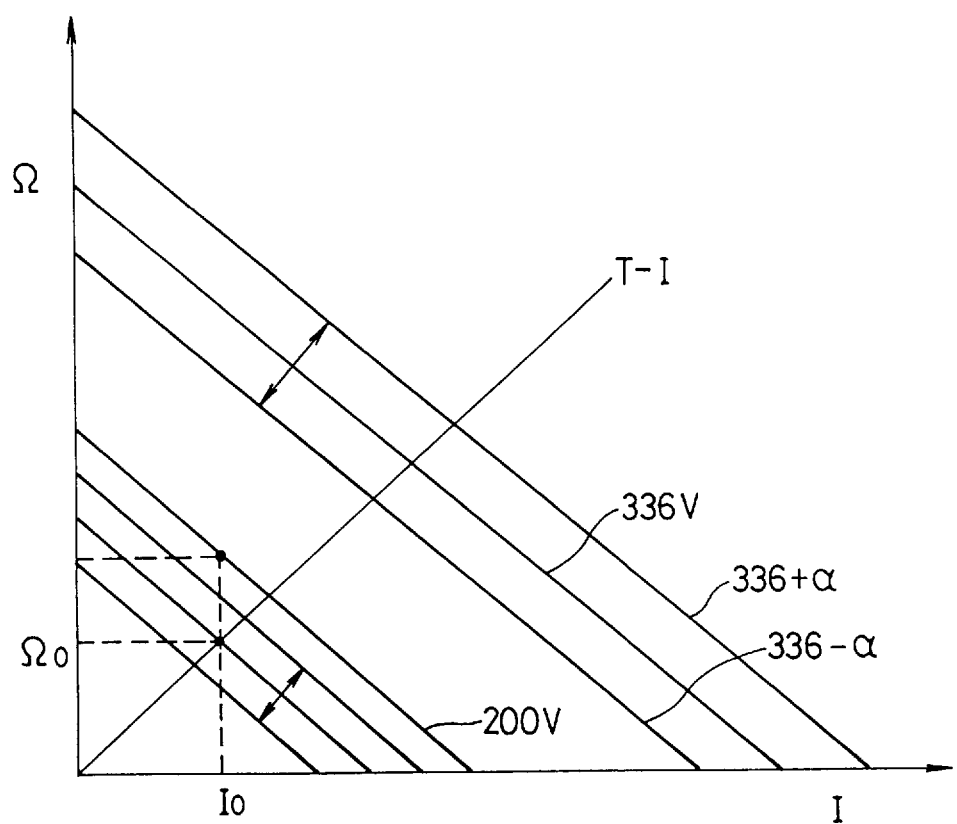
FIG. 4 graphically shows a motor response or a motor current-motor r.p.m. which is achieved by a controller including a signal controller and a power controller shown in FIG. 1.

The supply voltage from the main battery 7 always varies under condition of use, and the driving control of the motor 12 may take this into consideration. Specifically, FIG. 4 illustrates a motor response or the relationship between the current I and the number of revolutions of the motor as shown at 336V. When the supply voltage varies, as indicated by a double-ended arrow, to cause a drift of the motor response 336V in a range limited by 336±α, the PWM signal may be constantly controlled to maintain a characteristic curve of the number of revolutions below a limit 200V in order to maintain a deviation $|\Omega_0-\Omega|$ or the absolute value of a difference between a target number of revolutions, $\Omega_0$, corresponding to a vehicle speed and an actual number of revolutions $\Omega$ below $\Delta\Omega$.

With the described arrangement, the d.c. brushless motor 12 which is used to drive the oil pump, acting as a source of oil pressure to produce an assist force, may be directly connected to and driven from the onboard main battery 7. This arrangement dispenses with a d.c.-d.c. converter, choke coil, and/or flywheel diode used in the prior art arrangement, thus reducing the number of parts required, simplifying the construction, and achieving a reduction in the power dissipation; since the brushless motor 12 is directly coupled to the main battery 7, there is no area of sliding contact, in distinction to a motor with brush, thus allowing the useful life of the motor to be increased and acoustical noises produced by the motor to be reduced in an advantageous manner.

The magnitude of the power dissipation of a power steering apparatus with motor driven pump using a main battery onboard an electrically driven vehicle as a power supply will be considered in a comparison between a conventional arrangement and an arrangement according to the invention. FIGS. 5 and 6 represent arrangements which are contemplated corresponding to a conventional power steering apparatus with motor driven pump, but in which a conventional onboard 12V battery is replaced by a high tension d.c. power supply on the order of 96–600V, for example, which is common as a main battery on an electrically driven vehicle. FIG. 7 illustrates an arrangement of the power steering apparatus with motor driven pump according to the invention. It is to be understood that throughout these Figures, corresponding or equivalent parts as shown in FIG. 1 are designated by like numerals as used before. In addition, an abbreviation P stands for a pump, PS a body 1, and DC/DC a d.c.-d.c. converter. Character M represents a d.c. motor with brush.

In the arrangement of FIG. 5, a d.c. motor M with brush, which has heretofore been commonly used, is used to drive the pump, but the motor is driven by using a d.c.-d.c. converter which steps down a high voltage from the high tension d.c. power supply 7, representing the main battery of the electrically driven vehicle, to 12V. In the arrangement of FIG. 6, a brushless motor 12 is used to drive a pump P, but a high voltage from the power supply 7 is stepped down to 12V by d.c.-d.c. converter 12. Finally, FIG. 7 represents an apparatus according to the invention, which has been described in detail in connection with FIG. 1.

Figure 8:
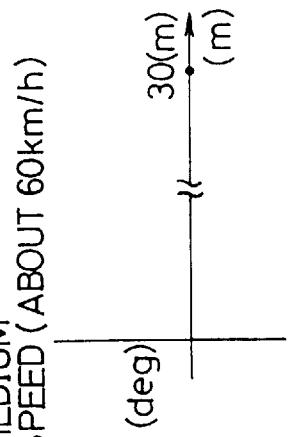
FIG. 8 graphically illustrates the steering response when a steering operation comprises a turn over an angle of 540° in opposite directions during a fixed interval of 36 seconds while the vehicle remains stationary.
Figure 10:
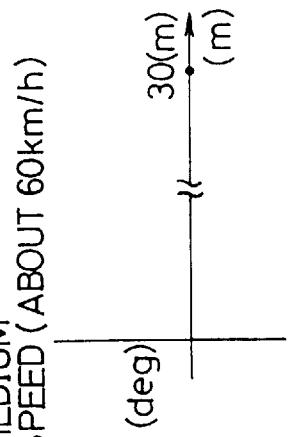
FIG. 10 graphically illustrates the steering response when a steering operation comprises a turn over an angle of 180° in opposite directions during a fixed interval of 10 seconds when the vehicle is running at low speed in the order of approximately 20–40 km/h.
Figure 12:
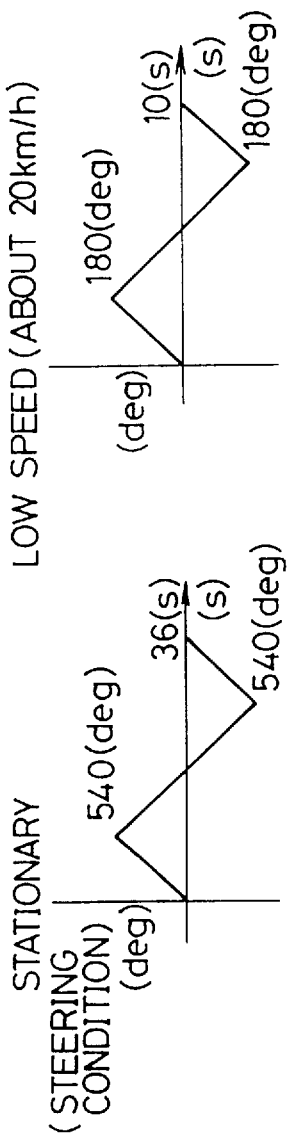
FIG. 12 graphically depicts an operation of a vehicle running for 30 minutes without any steering operation while the vehicle is operating at a medium speed of about 60 km/h.
Figure 9:
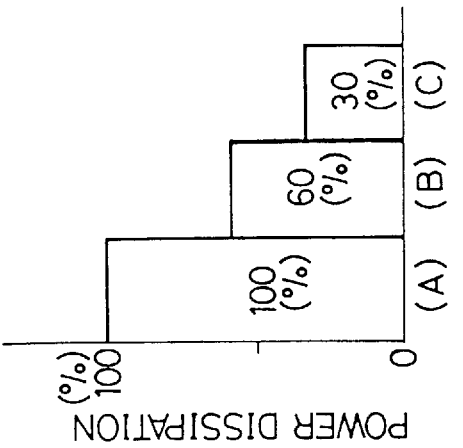
FIG. 9 is a bar graph representing the relative differences in power dissipation of the three power steering apparatuses depicted in FIGS. 5, 6, and 7, represented by columns A, B, and C, respectively, when each is employed to perform the steering operation depicted in FIG. 8.
Figure 11:
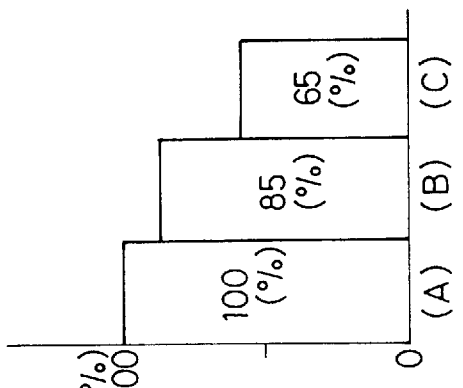
FIG. 11 is a bar graph representing the relative differences in power dissipation of the three power steering apparatuses depicted in FIGS. 5, 6, and 7, represented by columns A, B, and C, respectively, when each is employed to perform the steering operation depicted in FIG. 10.
Figure 13:
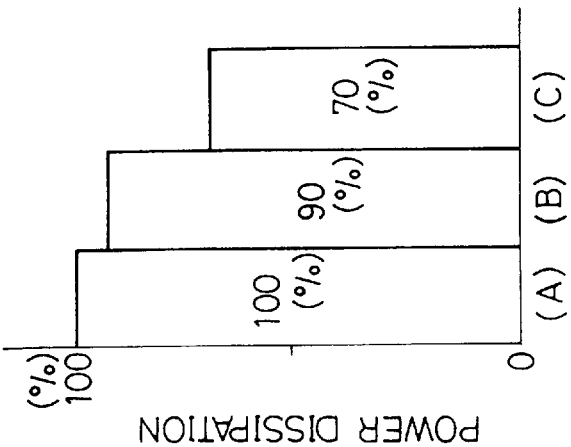
FIG. 13 is a bar graph representing the relative differences in power dissipation of the three power steering apparatuses depicted in FIGS. 5, 6, and 7, represented by columns A, B, and C, respectively, when each is employed to perform the steering operation depicted in FIG. 12.

FIGS. 9, 11, and 13 indicate the relative proportion of the power dissipation of the power steering arrangements depicted in FIGS. 5, 6, and 7. Initial reference is made to the power dissipation of the arrangement depicted in FIG. 5, represented by column A in each of FIGS. 9, 11, and 13. FIG. 9 represents the relative power dissipation when a steering operation comprises a single turning over an angle of 540° in opposite directions during a fixed interval of 36 seconds while the vehicle remains stationary, shown graphically by FIG. 8. FIG. 11 represents the relative power dissipation, when a steering operation comprises a single turning over an angle of 180° in opposite directions during a fixed interval of 10 seconds while the vehicle is running at a low speed of about 20–40 km/h, shown graphically by FIG. 10. FIG. 13 represents the relative power dissipation when no steering operation takes place and the vehicle continues to run for 30 minutes at a medium or high speed of about 60 km/h, shown graphically by FIG. 12. It will be apparent from these FIGS. 9, 11 and 13 that the apparatus according to the invention which is shown as the arrangement of 7 has achieved a maximum reduction in the power dissipation.

More specifically, in the present embodiment, the onboard main battery 7 comprises a high tension d.c. power supply delivering 336V. It will be seen that when the main battery 7 is directly connected to the brushless d.c. motor 12 to drive it, the proportion of the power dissipation as compared with the use of the d.c.-d.c. converter in the arrangements shown in FIGS. 5 and 6 will be 100% and 90%, respectively, when the vehicle is stationary, 100% and 85%, respectively, when running at a low speed, and will be 100% and 60%, respectively, when running at a medium speed without involving a steering operation, while in the arrangement of invention, a corresponding proportion will be 70%, 65%, and 30%, respectively, as indicted in FIGS. 9, 11, and 13, respectively, thus achieving a reduction in the power dissipation.

It is to be understood that the invention is not limited to the precise arrangement shown in the embodiment, but that the configuration of the parts and the construction can be changed and modified. For example, in the embodiment, the main battery 7 which is onboard an electrically driven vehicle and which is used to drive the brushless d.c. motor 12 has been described as comprising a high tension d.c. power supply which delivers 336V. However, this is exemplary only. Any high tension d.c. voltage supply which provides a high voltage in a range from 96 to 600V, for example, may be used. Obviously, this is not a limitation essential to the present invention, but the onboard main battery 7 may deliver a high voltage in excess of 600V.

A control over the drive of the brushless d.c. motor 12 has been described as being performed on the basis of a vehicle speed and a motor r.p.m. which are detected, but signals from sensors 20 shown as a single block element attached to the steering shaft 5 in FIG. 1 which detect a steer angle and a steering angular rate which result from a steering operation may also be forwarded to the signal controller 15 as represented by the solid line connection. Steering controller 15, in turn, uses the data represented by these signals to further control the application of a drive voltage to brushless d.c. motor 12.

As described, in the power steering apparatus with motor driven pump according to the invention, an onboard main battery of an electrically driven vehicle is directly connected to a brushless d.c. motor, and a controller is connected between the battery and the motor to provide a PWM control over the power supplied to the motor, thus driving a fluid pressure pump to feed a fluid pressure to a power cylinder in accordance with a steering operation to thereby produce a steering assist force. In this manner, despite a simple arrangement, it provides the following excellent effects: because the main battery is directly connected to the brushless motor while controlling the voltage supplied to the motor by the PWM control of the controller, a d.c.-d.c. converter which has been used in the prior art practice for step-down to a lower voltage is dispensed with, providing a gain in the power efficiency and achieving a reduction in the power dissipation. This can be most effectively utilized in a vehicle on which a high tension d.c. voltage supply is mounted, such as an electrically driven vehicle, for example. The elimination of the converter and the choke coil allows the number of parts required to be reduced, thus enabling a compact arrangement. Finally, the use of brushless motor avoids the problem of abrasion of the brushes, preventing any failure of the brushes, thus enhancing the operational reliability of the motor. The generation of acoustical noises which occur around the brush in a motor with a brush is also avoided, which adds to an efficient pump drive.

What is claimed is:

1. A power steering apparatus comprising:
    a main battery onboard an electrically driven vehicle;
    a brushless d.c. electric motor connected to the main onboard battery;
    a fluid pressure pump driven by the brushless d.c. motor for feeding a fluid pressure to a power cylinder in accordance with a steering operation to produce a steering assist force; and
    a controller connected between the main onboard battery and the brushless d.c. electric motor for applying a variable voltage from the main onboard battery to the brushless d.c. electric motor through pulse width modulation control.

2. The power steering apparatus according to claim 1, further including an encoder which determines a number of revolutions of the brushless d.c. electric motor by detecting a rotational position of a rotor internal to the brushless d.c. electric motor, and a vehicle speed sensor for detecting a vehicle speed of the vehicle, the controller controlling the voltage applied to the brushless d.c. electric motor based on a signal from the encoder representative of the number of revolutions of the brushless d.c. electric motor and a signal from the vehicle speed sensor representative of the vehicle speed.

3. The power steering apparatus according to claim 2, wherein the controller contains a map which determines a target number of revolutions of the brushless d.c. electric motor as a function of the vehicle speed which is supplied from the vehicle speed sensor and the controller determines a deviation between the target number of revolutions of the brushless d.c. electric motor based on the vehicle speed and the actual number of revolutions of the brushless d.c. electric motor as indicated by the signal from the encoder and regulates the application of the voltage to the brushless d.c. motor as a function of the determined deviation.

4. The power steering apparatus according to claim 3, wherein the controller includes:
    a signal controller connected to an auxiliary battery of the vehicle and that receives the signal from the vehicle speed sensor representative of vehicle speed and the signal from the encoder representative of the number of revolutions of the brushless d.c. electric motor; and
    a power controller connected to the main onboard battery through an operating switch and responsive to a signal from the signal controller for applying the voltage to the brushless d.c. electric motor.

5. The power steering apparatus according to claim 2, further including a steering angle sensor connected to a steerable steering assembly of the vehicle which detects a steer angle and a steering angular rate which result from a steering operation performed with the steering assembly and wherein the controller is connected to the steering angle sensor to receive signals representative of the detected steer angle and the detected steer angle rate and the controller regulates the voltage applied to the brushless d.c. electric motor based on the detected steer angle and steer angle rate detected by the steer angle sensor, the vehicle speed detected by the vehicle speed sensor, and the number of revolutions of the brushless d.c. motor detected by the encoder.

6. The power steering apparatus according to claim 2, wherein the controller includes:
    a signal controller connected to an auxiliary battery of the vehicle and that receives the signal from the vehicle speed sensor representative of vehicle speed and the signal from the encoder representative of the number of revolutions of the brushless d.c. electric motor; and
    a power controller connected to the main onboard battery through an operating switch and responsive to a signal from the signal controller for applying the voltage to the brushless d.c. electric motor.

* * * * *